(12) United States Patent
Carmichael et al.

(10) Patent No.: US 8,351,715 B1
(45) Date of Patent: Jan. 8, 2013

(54) SYSTEMS AND PROCESSES FOR TRANSLATING, COMPRESSING AND STORING SOLID-STATE MODEL DATA

(75) Inventors: Craig G. Carmichael, Farmington, MN (US); Joseph Pobiel, Eden Prairie, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 1218 days.

(21) Appl. No.: 12/169,453

(22) Filed: Jul. 8, 2008

(51) Int. Cl.
*G06K 9/36* (2006.01)
(52) U.S. Cl. ........ 382/232; 382/238; 382/235; 382/243; 382/241; 345/420; 345/421; 345/422; 345/423; 345/424; 345/426; 345/427; 345/428; 703/1; 703/2
(58) Field of Classification Search ................... None
See application file for complete search history.

(56) References Cited

U.S. PATENT DOCUMENTS

| | | | |
|---|---|---|---|
| 5,867,167 A * | 2/1999 | Deering | 345/419 |
| 7,092,974 B2 | 8/2006 | Thomas et al. | |
| 7,296,260 B2 | 11/2007 | Wen et al. | |
| 7,599,974 B2 * | 10/2009 | Hinds et al. | 708/200 |
| 2004/0268201 A1 * | 12/2004 | Haider et al. | 714/746 |
| 2008/0012854 A1 * | 1/2008 | Vinchon | 345/420 |
| 2008/0221840 A1 * | 9/2008 | Bassi et al. | 703/1 |
| 2009/0324009 A1 * | 12/2009 | Schulz | 382/103 |

OTHER PUBLICATIONS

Michael Deering, Geometry compression, Proceedings of the 22nd annual conference on Computer graphics and interactive techniques, p. 13-20, Sep. 1995.*
Taubin, G. "Geometric Compression Through Topical Surgery" ACM Transactions on Graphics, vol. 17, No. 2. Apr. 1998. pp. 84-115.*
Shikare, D. "Compression of Large Engineering 3D Models using Discovery of Repeating Geometric Features" Birla Institute of Technology and Science Pilani India, 2001.*
Co-pending U.S. Appl. No. 12/169,510, filed Jul. 8, 2008.
Right Hemisphere "Deep Exploration™ CAD Edition" obtained from http://www.righthemisphere.com/products/dexp/, in Applicants' possession prior to Jul. 8, 2008.

* cited by examiner

*Primary Examiner* — Atiba O Fitzpatrick
*Assistant Examiner* — Thomas A James
(74) *Attorney, Agent, or Firm* — Hamre, Schumann, Mueller & Larson, P.C.

(57) ABSTRACT

Systems and processes for compressing, translating and storing solid-state model data for a plurality of parts that form a solid-state model is provided. Compressing, translating and storing solid-state model data includes extracting the solid-state model data. Compressing, translating and storing solid-state model data also includes translating the sorted solid-state model data into one or more assembly components, a plurality of part components and a plurality of surface components. The process further requires storing each of the one or more assembly components, each of the plurality of part components and each of the plurality of surface components into a single file.

20 Claims, 13 Drawing Sheets

| ID | Remainder | B bits | # Bits |
|---|---|---|---|
| 4 | 0.25 | 010 | 3 |
| 9 | 0.28 | 011 | 3 |
| 18 | 0.5 | 100 | 3 |
| 3 | 0.62 | 101 | 3 |
| 11 | 0.25 | 010 | 3 |
| 12 | 0.5 | 100 | 3 |
| 10 | 0.65 | 101 | 3 |
| 7 | 0.25 | 010 | 3 |
| 6 | 0.5 | 100 | 3 |
| 15 | 0.5 | 100 | 3 |
| 19 | 0.06 | 001 | 3 |
| 5 | 0.5 | 100 | 3 |
| 17 | 0.25 | 010 | 3 |
| 2 | 0.06 | 001 | 3 |
| 1 | 0.3 | 011 | 3 |

| ID | Dimension | A Bit | # Bits |
|---|---|---|---|
| 4 | 0.25 | 001 | 3 |
| 9 | 0.28 | 001 | 3 |
| 18 | 0.5 | 001 | 3 |
| 3 | 0.62 | 001 | 3 |
| 8 | 1 | 010 | 3 |
| 11 | 1.25 | 001 | 3 |
| 12 | 1.5 | 001 | 3 |
| 10 | 1.65 | 001 | 3 |
| 13 | 3 | 100 | 3 |
| 7 | 4.25 | 011 | 3 |
| 14 | 6 | 100 | 3 |
| 6 | 7.5 | 011 | 3 |
| 15 | 7.5 | 001 | 3 |
| 19 | 8.06 | 011 | 3 |
| 5 | 8.5 | 001 | 3 |
| 16 | 9 | 010 | 3 |
| 17 | 10.25 | 011 | 3 |
| 2 | 11.06 | 011 | 3 |
| 1 | 12.3 | 011 | 3 |

FIGURE 11B

| ID | Dimension | # Bits |
|---|---|---|
| 1 | 12.3 | 64 |
| 2 | 11.06 | 64 |
| 3 | 0.62 | 64 |
| 4 | 0.25 | 64 |
| 5 | 8.5 | 64 |
| 6 | 7.5 | 64 |
| 7 | 4.25 | 64 |
| 8 | 1 | 64 |
| 9 | 0.28 | 64 |
| 10 | 1.65 | 64 |
| 11 | 1.25 | 64 |
| 12 | 1.5 | 64 |
| 13 | 3 | 64 |
| 14 | 6 | 64 |
| 15 | 7.5 | 64 |
| 16 | 9 | 64 |
| 17 | 10.25 | 64 |
| 18 | 0.5 | 64 |
| 19 | 8.06 | 64 |

FIGURE 11A

| ID | Remainder | C bits | # Bits |
|---|---|---|---|
| 9 | 0.03 | 001 | 3 |
| 3 | 0.12 | 100 | 3 |
| 10 | 0.15 | 101 | 3 |
| 19 | 0.06 | 010 | 3 |
| 2 | 0.06 | 010 | 3 |
| 1 | 0.05 | 000 | 3 |

FIGURE 11D

| ID | Remainder | B bits | # Bits |
|---|---|---|---|
| 4 | 0.25 | 010 | 3 |
| 9 | 0.28 | 011 | 3 |
| 18 | 0.5 | 100 | 3 |
| 3 | 0.62 | 101 | 3 |
| 11 | 0.25 | 010 | 3 |
| 12 | 0.5 | 100 | 3 |
| 10 | 0.65 | 101 | 3 |
| 7 | 0.25 | 010 | 3 |
| 6 | 0.5 | 100 | 3 |
| 15 | 0.5 | 100 | 3 |
| 19 | 0.06 | 001 | 3 |
| 5 | 0.5 | 100 | 3 |
| 17 | 0.25 | 010 | 3 |
| 2 | 0.06 | 001 | 3 |
| 1 | 0.3 | 011 | 3 |

SYSTEMS AND PROCESSES FOR TRANSLATING, COMPRESSING AND STORING SOLID-STATE MODEL DATA

FIELD

This disclosure relates to systems and processes for translating, compressing and storing data. More particularly, this description relates to translating, compressing and storing solid-state model data.

BACKGROUND

Computer aided design (CAD) programs are powerful design tools used in many industries to research and design three-dimensional objects and structures on a computer with nearly infinite precision and accuracy. Common CAD programs include AutoCAD owned by Autodesk, Inc. and Pro/ENGINEER owned by Parametric Technology Corporation. Typically, these programs allow a user to generate a three-dimensional solid-state model in a layer by layer format with each layer composed of multiple parts. Among the many functions these programs offer, at any point during the design of the solid-state model, the user is given the ability to manipulate, scale and rotate the entire model or particular layers or individual parts as necessary.

FIG. 2 shows one example of a rendered graphical display 200 of a plurality of parts 210 that together create a single model 220 using a CAD program. The CAD program stores each of the plurality of parts 210 in original solid-state model source data by breaking down each part 210 into the surfaces that form the part. Multiple data points that define each surface are stored as solid-state model source data by the CAD program. This allows the CAD program to generate each part stored in the solid-state model source data surface-by-surface.

The solid-state model source data is typically stored in a file directory containing multiple files. FIG. 3 shows one example of a file directory 300 containing multiple files that make up the solid-model source data for the model 220. In this example, the source data stored in the file directory 300 is stored into 49 files that take up a total of approximately 16 MB of memory. The files are made up of 13 assembly files 310A in an ASM file format, 34 part files 310A in a PRT file format, an IDX file format file 310C, and an MTL file format file 310D. The source data for each of the plurality of parts 210 is stored in a part file 310B or in a collection with other parts 210 that together form an assembly or sub-assembly of parts. For each part, the part files 310B and the assembly files 310A contain solid-model source data including a list of surfaces, edges and features that represent a physical, three-dimensional component.

In order to ensure the accuracy and precision of the solid-state model, CAD programs store solid-state data of each data point on the surface in a double precision format. The double precision format requires 64 bits for each data point being stored. The left most bit is set as the sign bit, followed by 11 bits set as the exponent and the remaining 52 bits set as the mantissa. In many solid-state models, there are numerous data points for each surface of a part, resulting in large memory storage requirements. As shown in FIG. 3, solid-state model data for an entire model is typically stored in a file directory containing multiple assembly files, each containing solid-model data for a collection of parts, and multiple part files, each containing solid-model data for a particular part of the model. Rendering and displaying a three-dimensional solid-state model on a two-dimensional display with substantial solid-state model data stored in a double precision format for every surface of every part, requires a high-end computer system that can run numerous large scale calculations quickly and efficiently.

Another drawback of solid-state model data generated from CAD programs is that the solid-state model data is not easily transferable to other users or other computers. Due to memory size of the solid-state model data these models are typically too big to send over email. Also, even if the solid-state model data is transferred to another computer, the new computer typically requires a CAD program to view, edit and manipulate the solid-state model. As many computers are not powerful enough to perform the calculations needed to process the data or are not licensed to use CAD software, allowing multiple users to view, edit and manipulate the solid-state model becomes difficult.

Thus, improved processes and systems for compressing, translating and storing solid-state model data are needed.

SUMMARY

This disclosure relates to improved systems and processes for compressing, translating and storing solid-state model data. These systems and processes allow for near lossless compression while providing the solid-model data necessary for maintaining the structural integrity of the three-dimensional solid-state model being used.

In one embodiment, a process for compressing, translating and storing solid-state model data for a plurality of parts that form a solid-state model is provided. Compressing, translating and storing solid-state model data includes extracting the solid-state model data. Compressing, translating and storing solid-state model data also includes translating the sorted solid-state model data into one or more assembly components, a plurality of part components and a plurality of surface components. The process further requires storing each of the one or more assembly components, each of the plurality of part components and each of the plurality of surface components into a single file.

In another embodiment, a process for translating and compressing a part of a solid-state model containing dimensional data is provided. The process includes translating a first one of the plurality of dimensional data points from a double precision format into a blueprint compression format. The process further includes translating a second one of the plurality of dimensional data points from a double precision format into a blueprint compression format, wherein translating the second one of the plurality of dimensional data points includes determining a difference between a magnitude of the second one of the plurality of dimensional data points and a magnitude of the first one of the plurality of dimensional data points. Further, the process requires that the second one of the plurality of dimensional data points immediately precedes or follows the first one of the plurality of dimensional data points if the plurality of dimensional data points are sorted by magnitude.

In yet another embodiment, a system for compressing, translating and storing solid-state model data for one or more parts that form a solid-state model is provided. The system includes an extraction module, a compressing module and a storing module. The extraction module extracts solid-state model data from a root assembly. The compressing module compresses and translates the extracted solid-state model data into one or more assembly components, a plurality of part components and a plurality of surface components. The sorting module stores each of the one or more assembly components, the plurality of part components and the plurality of surface components into a single file.

DESCRIPTION OF THE DRAWINGS

FIG. 11A provides a table of the dimensional data points of the part shown in FIG. 10 sorted by an index.

FIG. 11B provides a table of the dimensional data points of the part shown in FIG. 10 sorted from the smallest magnitude in inches to the largest magnitude in inches as well as the first three bits of the compressed and translated dimensional data points.

FIG. 11C provides a table of the fourth, fifth and sixth bit values assigned for the compressed translated dimensional data points of the example part shown in FIG. 10.

FIG. 11D provides a table of the seventh, eighth and ninth bit values assigned for the dimensional data points of the example part shown in FIG. 10.

DETAILED DESCRIPTION

Figure 1:
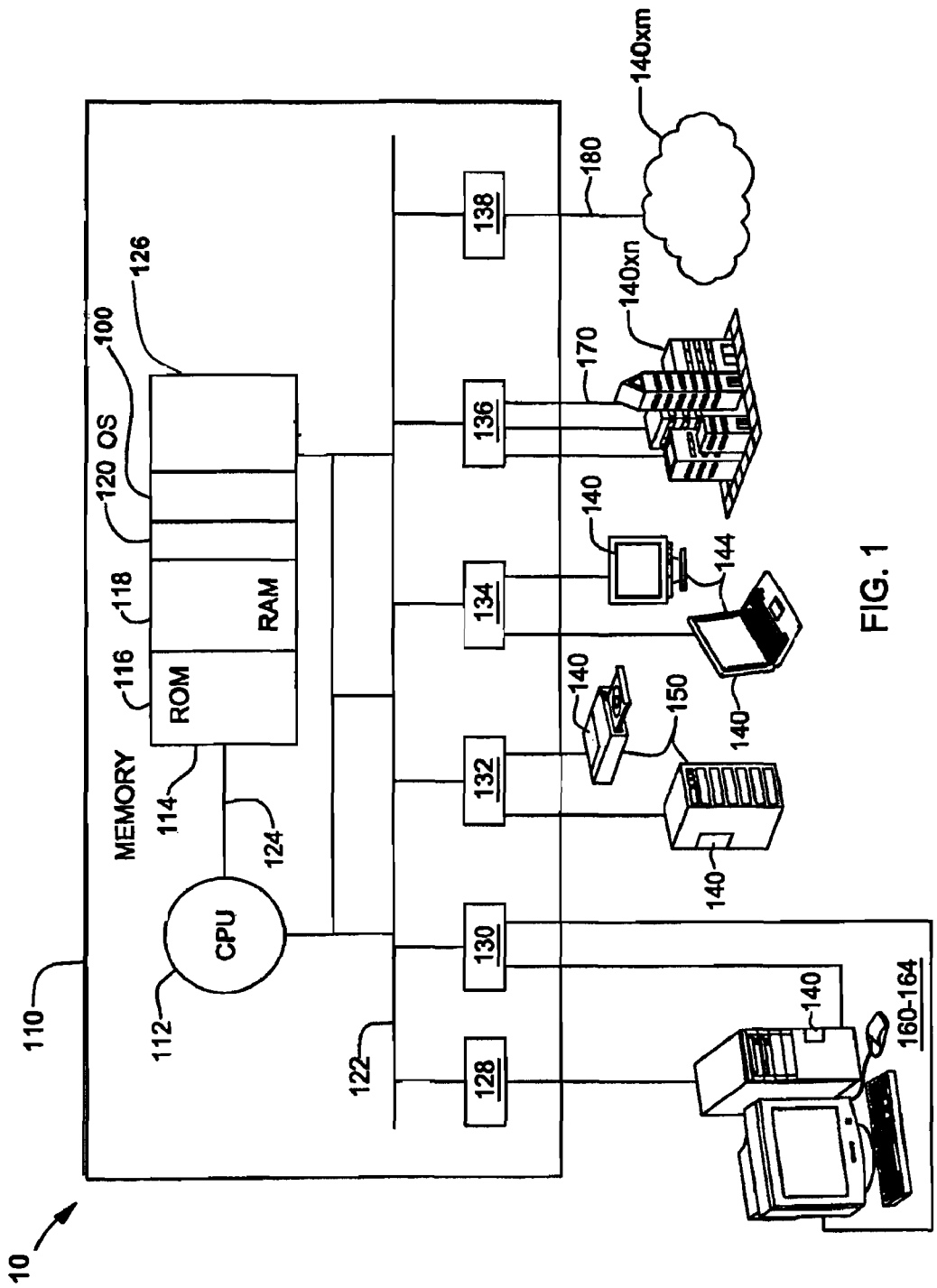
FIG. 1 is a high-level block diagram of a computer network system consistent with an embodiment of the solid-model data compression and translation tool.

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice what is claimed, and it is to be understood that other embodiments may be utilized and that logical, mechanical and electrical changes may be made without departing from the spirit and scope of the claims. The following detailed description is, therefore, not to be taken in a limiting sense.

Embodiments presented herein involve systems and processes for compressing, translating and storing solid-state model data. Advantageously, these embodiments allow for near lossless compression while providing components necessary for maintaining the structural integrity of the three-dimensional solid-state model being used. These components include, but are not limited to, the hierarchical relationships between parts, parts/assembly names, cosmetic appearance/text, geometric properties (i.e., surface areas, volumes, etc.), material properties (i.e., inertia, density, etc.). Moreover, the embodiments herein reduce the size of the compressed solid-state model data within a range of approximately 0.1-2% the size of the original solid-state model source data.

As will be appreciated by one of skill in the art, the embodiments presented herein may be shown as a process, a data processing system, a computer program product and a service for translating and compressing solid-state model data. Accordingly, the embodiments presented herein may take the form of an entirely hardware embodiment, an entirely software embodiment, or an embodiment combining software and hardware aspects. Furthermore, the embodiments presented herein may take the form of a computer program product on a computer-usable storage medium having computer-usable program components embodied in the medium. Any suitable computer readable medium may be utilized including hard disks, CD-ROMs, optical storage devices, a transmission media such as those supporting the Internet or an intranet, or magnetic storage devices.

Computer program source code of the solid-model data compression and translation tool in accordance with a preferred mode described herein may be written in an object-oriented programming language such as C, JAVA, SMALLTALK or C++. Object code of the solid-model data compression and translation tool may execute entirely on an individual server or client, partly on an individual or a backup server or client, as a stand-alone software package, partly on the individual or backup server or client and partly on a remote server or client or entirely on the remote server or client. In the latter scenario, the remote server or client may be connected to the individual or backup server or client through a local area network (LAN) or a wide area network (WAN), or the connection may be made to the remote server or client via the Internet using an Internet Service Provider.

The solid-model data compression and translation tool is described below with reference to flowchart illustrations and/or block diagrams of processes, apparatus (systems), components, and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided as one or more components to a processor of a general purpose computer, special purpose computer, or other programmable data processing apparatus to produce a machine, such that the components, which execute via the processor of the computer or other programmable data processing apparatus, create means for implementing the functions/acts specified in the flowchart and/or block diagram block or blocks.

These computer program components for the solid-model data compression and translation tool may also be stored in a computer-readable memory that can direct a computer or other programmable data processing apparatus to function in a particular manner, such that the components stored in the computer-readable memory produce an article of manufacture including components which implement the function/act specified in the flowchart and/or block diagram block or blocks. The computer program components may be loaded onto a computer or other programmable data processing apparatus to cause a series of operational steps to be performed on the computer or other programmable apparatus to produce a computer implemented process such that the components which execute on the computer or other programmable apparatus provide steps for implementing the functions/acts specified in the flowchart and/or block diagram block or blocks.

Referring to FIG. 1, a high-level block diagram of a computer network system 10 consistent with an embodiment of the solid-model data compression and translation tool 100 is shown. Computer network system 10 preferably comprises a number of secure networked computers 110 (only one of which is shown), each of which may have a central processing unit (CPU) 112, memory 114, a graphics processing unit (GPU) 126, and various digital and/or analog interfaces 128-138. The various devices communicate with each other via an internal communications bus 122. CPU 112 is a general-purpose programmable processor, executing instructions stored in memory 114. While a single CPU 112 is shown in FIG. 1, it should be understood that computer systems having multiple CPUs could be used. CPU 112 is capable of executing an operating system 120 and the solid-model data compression and translation tool 100. CPU 112 is also capable of generating the computer program components embodying the solid-model data compression and translation tool 100 and is capable of receiving and transmitting the program instructions embodying the solid-model data compression and translation tool 100. The GPU 126 is a dedicated graphics rendering unit that is used for manipulating and displaying computer graphics, including three dimensional solid-model data. Communications bus 122 supports transfer of data, commands and other information between different devices, and while shown in simplified form as a single bus, it is typically structured as multiple buses including an internal bus 124 which may connect the CPU 112 directly with memory 114.

Memory 114 comprises a read only memory (ROM) 116 and a random-access memory (RAM) 118 for storing the operating system 120, and the solid-model data compression and translation tool 100. Typically, those portions or programs, routines, and/or modules of the operating system 120 necessary to "boot up" are stored in ROM 116. RAM 118 typically stores programs and data that will be erased when the computer turns off. Memory 114 is shown conceptually as a single monolithic entity but it is well known that memory is often arranged in a hierarchy of caches and other memory devices, some or all of which may be integrated into the same semiconductor substrate as the CPU 112. RAM 118 devices comprises the main storage of computer, as well as any supplemental levels of memory, e.g., cache memories, nonvolatile or backup memories, programmable or flash memories, other read-only memories, etc. In addition, memory 114 may be considered to include memory storage physically located elsewhere in computer, e.g., a cache memory in a processor or other storage capacity used as a virtual memory, e.g., as stored on a mass storage device 150 or on another computer coupled to one of the secure networked computers 110 via a network. It is fully realizable that the solid-model data compression and translation tool 100 can be used to store data within any memory 114 including ROM and RAM located within and outside the computer processing device 110 upon which the solid-model data compression and translation tool 100 is installed and executing.

In the context herein memory 114 may also be considered nonvolatile or backup memories or a programmable or flash memories, read-only memories, etc., in a device physically located on a different computer, client, server, or other hardware memory device, such as a mass storage device or on another computer coupled to computer via network. Memory 114 may comprise remote archival memory such as one or more rotating magnetic hard disk drive units, a tape or optical driver. Memory 114 may also be considered one or more mass storage devices, such as a floppy or other removable disk drive, a hard disk drive, a direct access storage device (DASD), an optical drive e.g., a compact disk (CD) drive, a digital video disk (DVD) drive, etc., and/or a tape drive, among others.

Operating system 120 and the solid-model data compression and translation tool 100 and other applications 300 reside in memory 114. Operating system 120 provides, inter alia, functions such as device interfaces, management of memory pages, management of multiple tasks, etc. as is known in the art. Examples of such operating systems may include LINUX, AIX, UNIX, Windows-based, Z/os, V/os, OS/400, an Rios, a handheld operating system, etc. These operating systems 120 and the solid-model data compression and translation tool 100 along with other applications, components, programs, objects, modules, etc. may also execute on one or more processors in another computer coupled to computer 110 via a network 170, 180, e.g., in a distributed or client-server computing environment, whereby the processing required to implement the functions of a computer program may be allocated to multiple computers 110 over a network 170, 180.

In general, the solid-model data compression and translation tool 100 executes within the CPU 112 to implement the embodiments of the invention, whether implemented as part of an operating system or a specific application, component, program, object, module or sequence of instructions may be referred to herein as computer programs or simply components. The solid-model data compression and translation tool 100 typically comprises one or more instructions that are resident at various times in various memory 114 and storage in a device and that, when read and executed by one or more processors in the processing device 110, cause that device 110 to perform the steps necessary to execute steps or elements embodying the various aspects of the invention.

It should be appreciated that computer 110 typically includes suitable analog and/or digital interfaces 128-138 between CPU 112 and the attached devices as is known in the art. For instance, computer 110 typically receives a number of inputs and outputs for communicating information externally. For interface with a software developer or operator, computer 110 typically includes one or more software developer input devices 160-164, e.g., a keyboard, a mouse, a trackball, a joystick, a touchpad, and/or a microphone, among others, and a display such as a CRT monitor, an LCD display panel, and/or a speaker, among others. It should be appreciated, however, that some implementations of computer 110, e.g., some server implementations, might not support direct software developer input and output. Terminal interface 134 may support the attachment of single or multiple terminals or laptop computers 144 and may be implemented as one or multiple electronic circuit cards or other units. Data storage 150 preferably comprises one or more rotating magnetic hard disk drive units, although other types of data storage, including a tape or optical driver, could be used. For additional storage, computer 110 may also include memory 114 comprising one or more mass storage devices 150, e.g., a floppy or other removable disk drive, a hard disk drive, a direct access storage device (DASD), an optical drive e.g., a compact disk (CD) drive, a digital video disk (DVD) drive, etc., and/or a tape drive, among others. The solid-model data compression and translation tool 100 may be located on storage, including RAMs or mass storage devices of different computers 110 that are located through the Internet 180, a WAN 170, and other connected interfaces 128-138. The interfaces 128-138 may also be wireless.

Furthermore, computer 110 may include an interface 136, 138 with one or more WAN networks 170, or Internet networks 180 to permit the communication of information with other processing devices and databases 140 coupled to the WAN network(s) 170, or Internet network(s) 180. Network interface(s) 136, 138 provides a physical and/or wireless connection for transmission of data to and from a network(s) 170, 180. Network(s) 170, 180 may be the Internet, as well as any smaller self-contained network such as an Intranet, a wide area network (WAN), a local area network (LAN), or other internal or external network using, e.g., telephone transmissions lines, satellites, fiber optics, T1 lines, wireless, public cable, etc. and any various available technologies. One of ordinary skill in the art understands that computer system 10 may be connected to more than one WAN network(s) 170, or Internet network(s) 180 simultaneously. Computer system and remote systems 128 may be desktop or personal computers, workstations, a minicomputer, a midrange computer, a mainframe computer. Any number of computers and other microprocessor devices, such as personal handheld computers, personal digital assistants, wireless telephones, etc., which may not necessarily have full information handling capacity as the large mainframe servers, may also be networked through WAN network(s) 170, or Internet network(s) 180.

Figure 4:
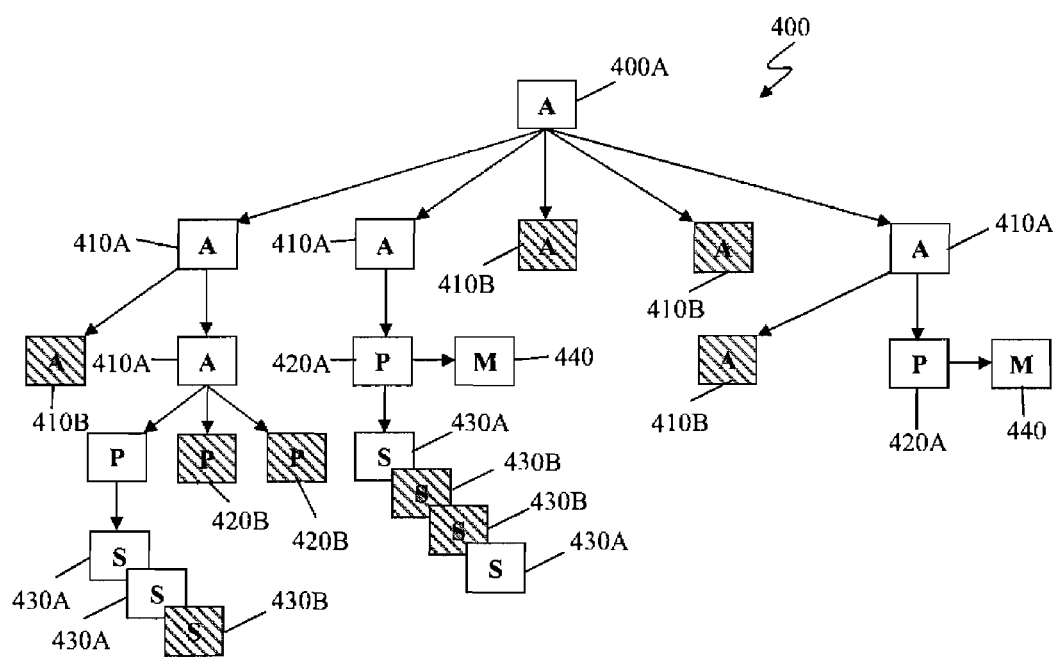
FIG. 4 illustrates one embodiment of a hierarchical tree displaying the components of the compressed and translated solid-model data.

The solid-model data compression and translation tool 100 compresses and translates solid-model source data into one or more assembly components 410A, B, one or more part components 420A, B, one or more surface components 430A, B and in some embodiments, one or more model components 440. As shown in FIG. 4, these components form a hierarchical tree 400 of the compressed and translated solid-model data, where each of the assembly components 410A include data referring to a collection of one or more of the other assembly components 410A, B or one or more of the part components 420A, B. Each of the one or more assembly components 410B, part components 420B and surface components 430B are copies of one of the assembly components 410A, part components 420A or surface components 430A that are transformed using a transformation matrix, described in more detail below. Accordingly, each of the assembly components 410B includes a transformation matrix and an identifier to one of the assembly components 410A. Each part component 420A includes data referring to a collection of one or more of the surface components 430A, B and/or one of the model components 440. Each part component 420B includes a transformation matrix and an identifier to one of the part components 420A. Each surface component 430A includes normal, vector and index data to approximate a surface of the solid-state model using a tessellation process, described in more detail below. Each surface component 430B includes a transformation matrix and an identifier to one of the surface components 430A. Each model component 440 is an optional copy of the solid-model source data that can generate every data point of every surface used to form the part being compressed and translated.

Figure 5:
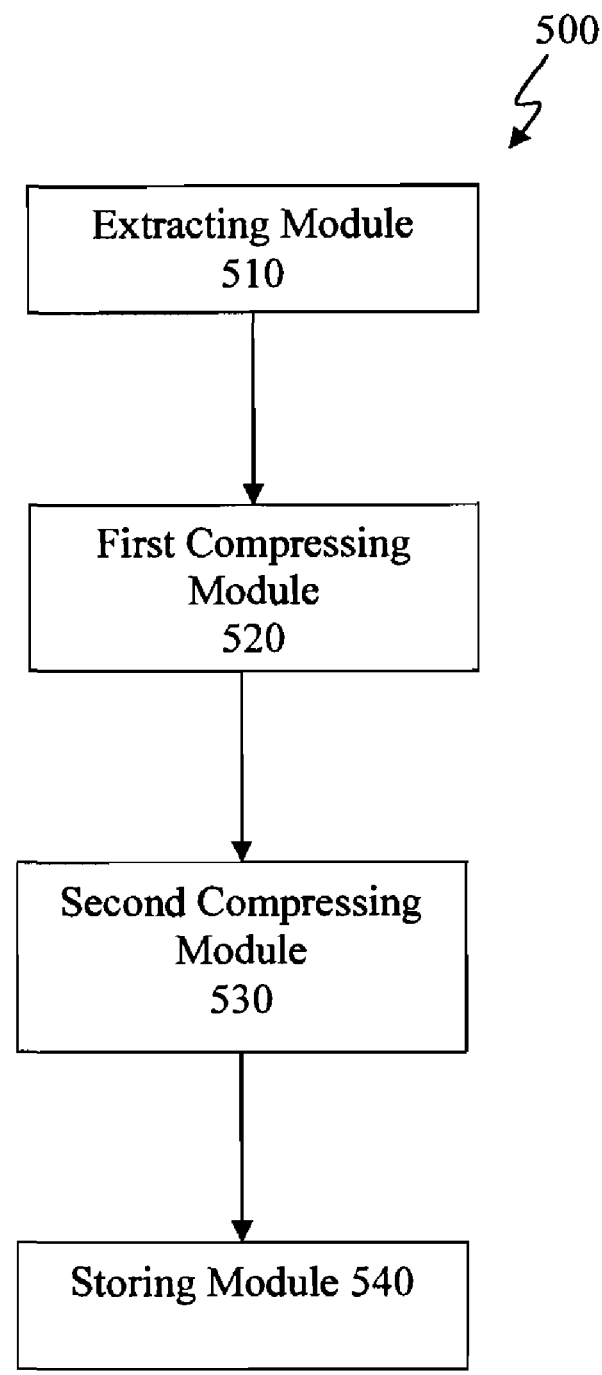
FIG. 5 illustrates one embodiment of a system for translating and compressing stored three-dimensional solid-state model data.

FIG. 5 illustrates one embodiment of a system 500 for translating and compressing three-dimensional solid-state model data into the hierarchical format described above, with respect to FIG. 4, using the solid-model data compression and translation tool 100. The system 500 includes an extracting module 510, a first compressing module 520, a second compressing module 530 and a storing module 540 that work together to translate, compress and store solid-state model data into a single solid-state model data file. A module as defined herein refers to a computer programming structure that is an integral part of the system 10 and works in conjunction with the other modules of the system 10 but for the most part operates independently from the operations of the other modules.

Figure 3:
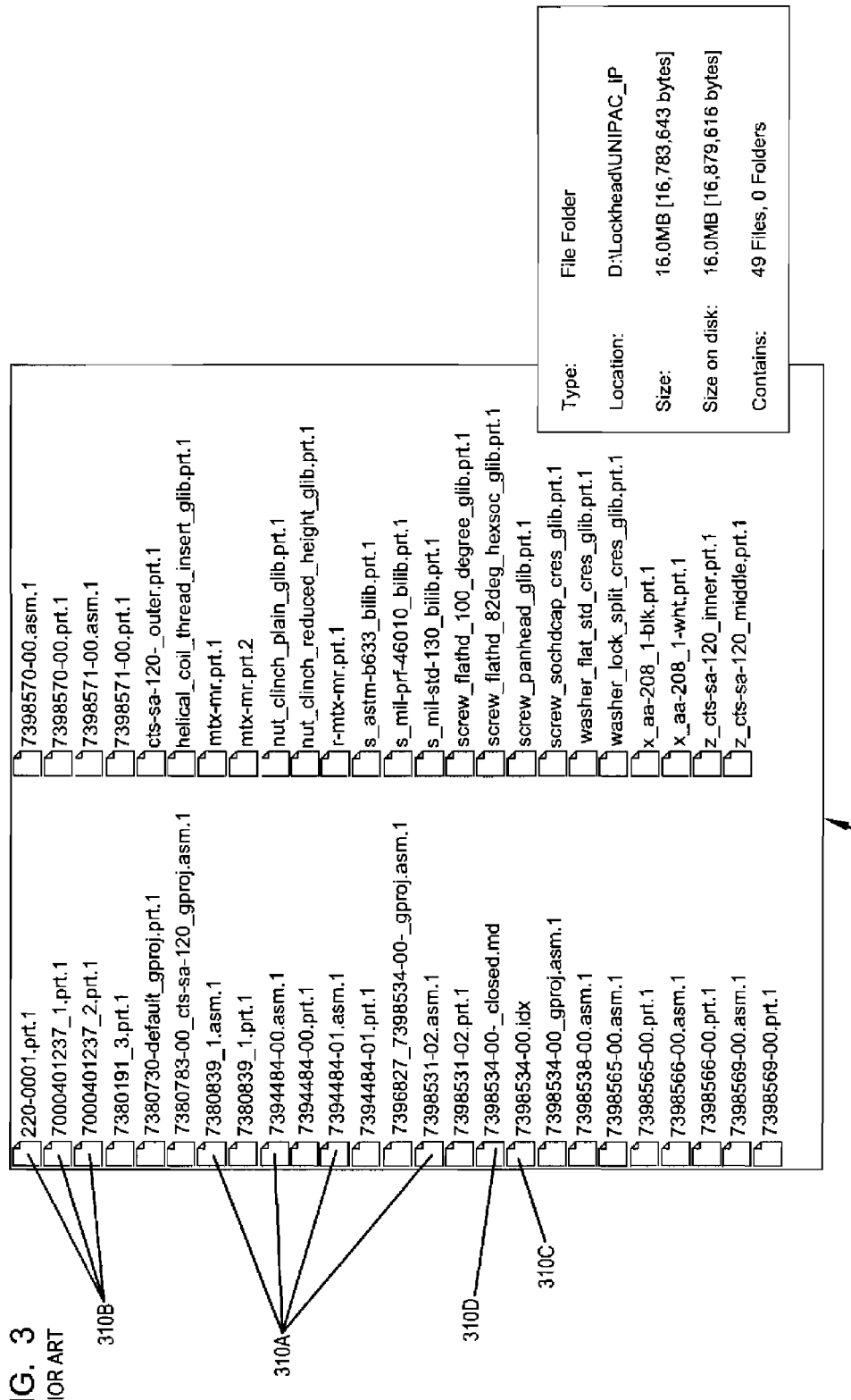
FIG. 3 is one prior art example of a file directory containing multiple files that make up the source data for the model shown in FIG. 2.

When a solid-state model is to be translated, compressed and stored using the system 500, the extracting module 510 begins the process by extracting solid-model source data to be translated from the root assembly of the CAD program used to generate the solid-state model. In other embodiments, the extracting module 510 extracts data from a file directory containing one or more part files and assembly files, such as the directory shown in FIG. 3, and not the root assembly of the CAD program.

The first compressing module 520 is configured to receive the extracted data from the extracting module 510. The extracted data includes geometric data and non-geometric data. The geometric data includes data relating to how surfaces, parts and assemblies are formed and positioned in a three dimensional space to generate the solid-state model. Dimensional data is one type of data included in the geometric data that specifies how features, such as holes, slots, grooves, cuts, protrusions, etc. are spatially related on the part. Dimensional data typically requires large amounts of memory storage to store all of its information. The extracted data also includes non-geometric data including cosmetic features such as text, color, bitmaps, etc., and structural features such as the size of a bounding box, part surface area, feature lengths, volume, density, center of gravity, moments of inertia, etc. The geometric data is compressed and translated by the first compressing module 520 using a tessellation compression process and/or a blueprint compression process. In some embodiments other compression tools may also be used.

The first compressing module 520 recursively progresses through the geometric data from the surface components to the assembly components to form a hierarchical tree, similar to the hierarchical tree 400 shown in FIG. 4.

Figure 6:
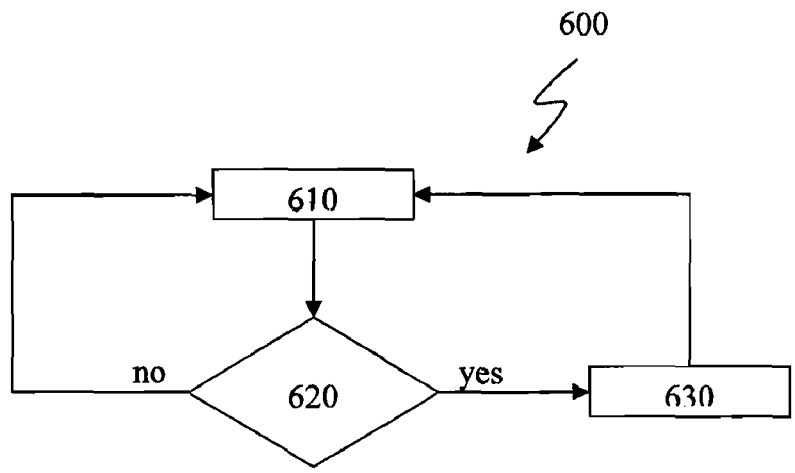
FIG. 6 is a flow chart that illustrates how geometric data for each surface of a part is compressed and translated using the compressing module.

FIG. 6 is a flow chart 600 that illustrates one embodiment of how the geometric data for each surface of a part is compressed and translated using the first compressing module 520. At step 610, the geometric data defining the data points of a surface for a particular surface is translated and compressed using the tessellation compression process. The tessellation compression process deconstructs geometric data for a given surface and reconstructs the surface using a plurality of simple objects, such as triangles. The resulting surface component stores vertex data, normal data and index data for each tessellation triangle of the surface component. Such tessellation processes are well known in the art.

The tessellation process includes normalizing and storing index data, vertex data, and normal data at the desired resolution for each component relative to that component's minimal and maximal limits. In one embodiment, the vertex data is compressed into an unsigned short format allowing two bytes of memory for each x, y and z axis and normalized to a bounding box of the part component formed at least in part by the surface component. The normal data is compressed and normalized into an unsigned char format allowing one byte of memory for each x, y and z axis. The index data is compressed and normalized into an unsigned char format allowing one byte of memory if the number of vertices in the surface component is less than or equal to 256, as an unsigned short format allowing two bytes of memory if the number of vertices in the surface component is less than or equal to 65,536. In some embodiments, a one bit tag is used to identify a planar surface or a curve followed by byte sized coordinates defining the plane or curve is also included. After the tessellation compression process generates a surface component, the flowchart 600 proceeds to step 620.

For example, if the bounding box of a component in its local coordinate system has a minimal vertex value x of 10 and a maximal vertex value x of 25, then every vertex can be specified within those bounds using two bytes to obtain a resolution of $1/256^2$ or 1/65,536. Therefore, if the extracted vertex value x is 36,324, the normalized vertex value would be $10+(36,324/65536)\times(25-10)=18.3139$. The resolution used to normalize the index data, vertex data and normal data can vary from one surface component to another surface component. For example, using only two bytes of storage to obtain a resolution of 1/65,536 as described above, may be sufficiently accurate for a part like a bolt or nut, but may not be sufficiently accurate for a larger part such as a shelf. The resolution can therefore be altered for the shelf part to use more bytes of storage, and thus retaining a highly accurate tessellation of the solid-state model.

At step 620, the first compressing module 520 determines whether the surface component is sufficiently similar to any previously generated surface components. The current surface component is sufficiently similar to a previous surface component if the number of vertices and the number of tessellated triangles are the same; if every index is the same; and if all the vertex coordinates of the current surface component can be rotated, transformed and/or scaled to match with high precision all of the vertex coordinates of the previous surface component. If the current surface component is sufficiently similar to a previous surface component, the flowchart 600 proceeds to step 630. If the current surface component is not sufficiently similar to a previous surface component, the surface component is sent to the second compressing module 530 and the flowchart 600 proceeds back to step 610 until a surface component is generated for every surface of the part being compressed and translated.

At step 630, the first compressing module 520 replaces the data stored in the surface component with a 4×4 transformation matrix that can translate the previous surface component into the current surface component, and a surface component identifier. The current surface component is then sent to the second compressing module 530 and the flowchart 600 then proceeds back to step 610 until a surface component is generated for every surface of the part being compressed and translated.

Figure 7:
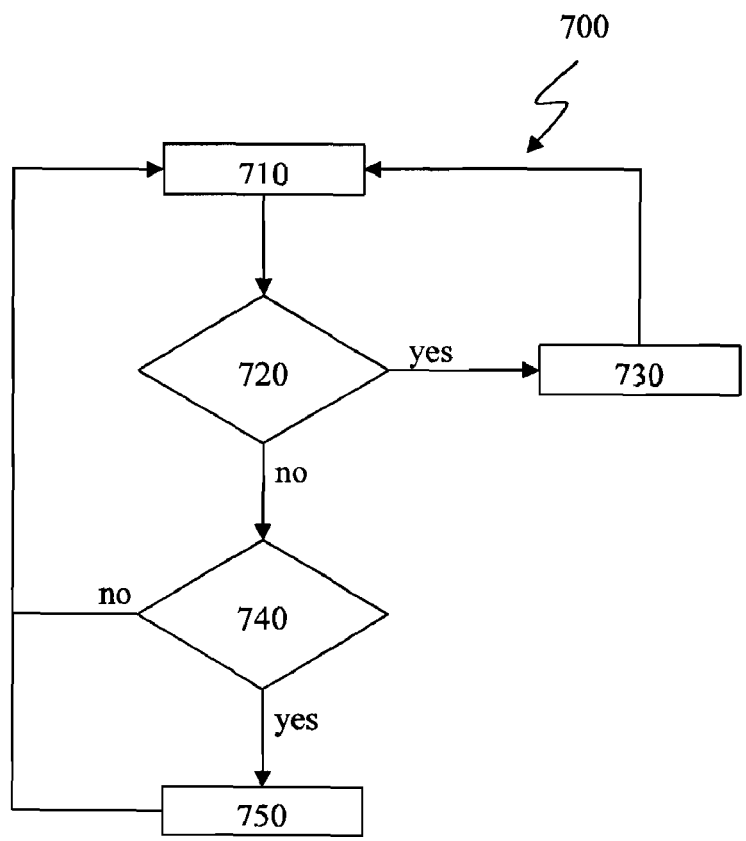
FIG. 7 is a flow chart that illustrates how geometric data for each part of an assembly is compressed and translated using the compressing module.

FIG. 7 is a flow chart 700 that illustrates one embodiment of how the geometric data for each part of an assembly is compressed and translated using the first compressing module 520. At step 710, the first compressing module 520 generates a part component that references every surface component of the part being compressed and translated and contains non-geometric data. Once a part component is generated, the flow chart 700 proceeds to step 720.

At step 720, the first compressing module 520 determines whether the part component is sufficiently similar to any previously generated part components. The current part component is sufficiently similar to a previous part component if all the surface components that form the current part component can be rotated, transformed and/or scaled using a single transformation matrix to match with high precision all of the surface components of the previous part component. If the current part component is sufficiently similar to a previous part component, the flowchart 700 proceeds to step 730. If the current part component is not sufficiently similar to a previous part component, the flowchart 700 proceeds to step 740.

At step 730, the first compressing module 520 replaces every reference to a surface component in the part component with a 4×4 transformation matrix that can translate the previous part component into the current part component, and a part component identifier. The part component is then sent to the second compressing module 530 and the flowchart 700 then proceeds back to step 710 until a part component is generated for every part of the assembly being compressed and translated.

At step 740, the first compressing module 520 determines whether the part component requires a model component. The model component is an optional component that enables an end user to manipulate the solid-model data after being translated and compressed using the system 500. In some embodiments, a user predefines which parts of the solid-state model being compressed and translated require a model component. Moreover, if a model component is present in the resulting compressed and translated solid-state model file, a part component containing geometric data compressed and translated using the tessellation compression process is not required to be stored in the compressed and translated solid-state model file. If the first compressing module 520 determines that the part component requires a model component, the flowchart 700 proceeds to step 750. If the first compressing module 520 determines that the part component does not require a model component, the part component is sent to the second compressing module 530 and the flowchart 700 then proceeds back to step 710 until a part component is generated for every part of the assembly being compressed and translated.

At step 750, the first compressing module 520 generates a model component for the part component. This includes using the blueprint compression process to compress dimensional data. The blueprint compression process for compressing dimensional data is discussed in more detail below. Once a model component is formed, a unique identifier is included in the part component that corresponds with the module component. In some embodiments, the second compressing module 530 then removes every surface component referenced by the part component. Both the part component and the model component are sent to the second compressing module 530 and the flowchart 700 proceeds back to step 710 until a part component is generated for every part of the assembly being compressed and translated.

Figure 8:
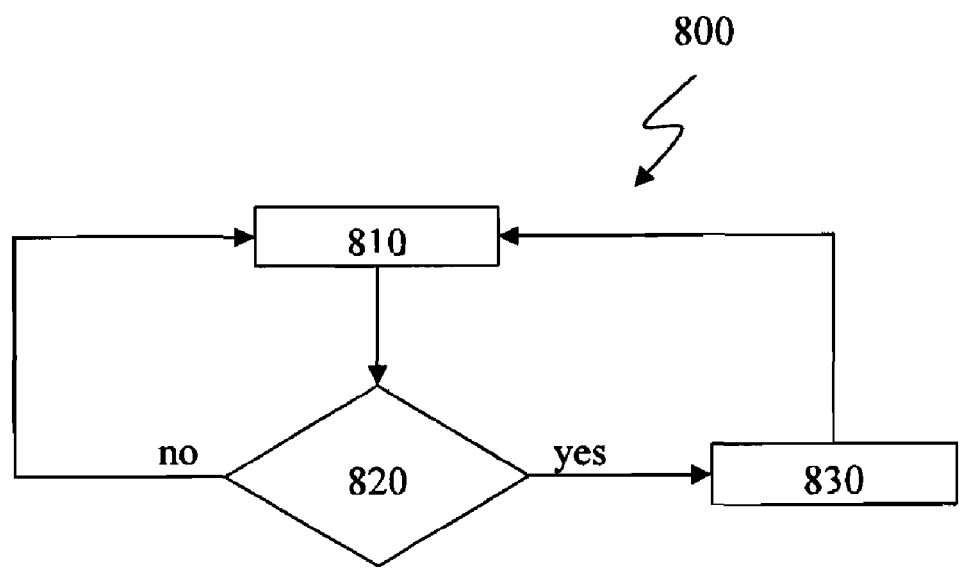
FIG. 8 is a flow chart that illustrates how geometric data for each assembly of a solid-state model is compressed and translated using the compressing module.

FIG. 8 is a flow chart 800 that illustrates one embodiment of how the geometric data for each assembly of a solid-state model is compressed and translated using the first compressing module 520. At step 810, the first compressing module 520 generates an assembly component that references every part component of the assembly being compressed and translated. Once an assembly component is generated, the flow chart 800 proceeds to step 820.

At step 820, the first compressing module 520 determines whether the assembly component is sufficiently similar to any previously generated assembly components. The current assembly component is sufficiently similar to a previous assembly component if all the part components that form the current assembly component can be rotated, transformed and/or scaled using a single transformation matrix to match with high precision all of the part components of the previous assembly component. If the current assembly component is sufficiently similar to a previous assembly component, the flowchart 800 proceeds to step 830. If the current assembly component is not sufficiently similar to a previous assembly component, another assembly of the solid-state model proceeds through the flowchart 800 until an assembly component is generated for every assembly of the solid-state model being compressed and translated.

At step 830, the first compressing module 520 replaces every reference to a part component in the assembly component with a 4×4 transformation matrix that can translate the previous assembly component into the current assembly component, and an assembly component identifier. The assembly component is then sent to the second compressing module 530 and the flowchart 800 then proceeds back to step 810 until an assembly component is generated for every assembly of the solid-state model being compressed and translated.

Figure 9:
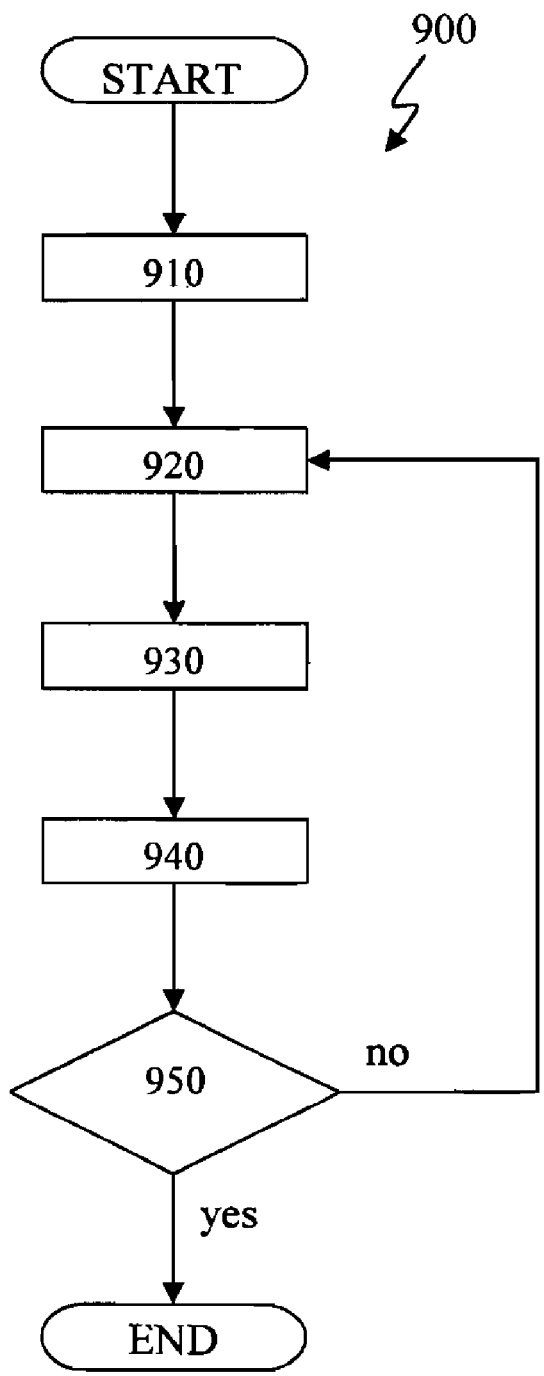
FIG. 9 is a flow chart that illustrates how dimensional data is translated from a double precision format using a blueprint compression process.
Figure 10:
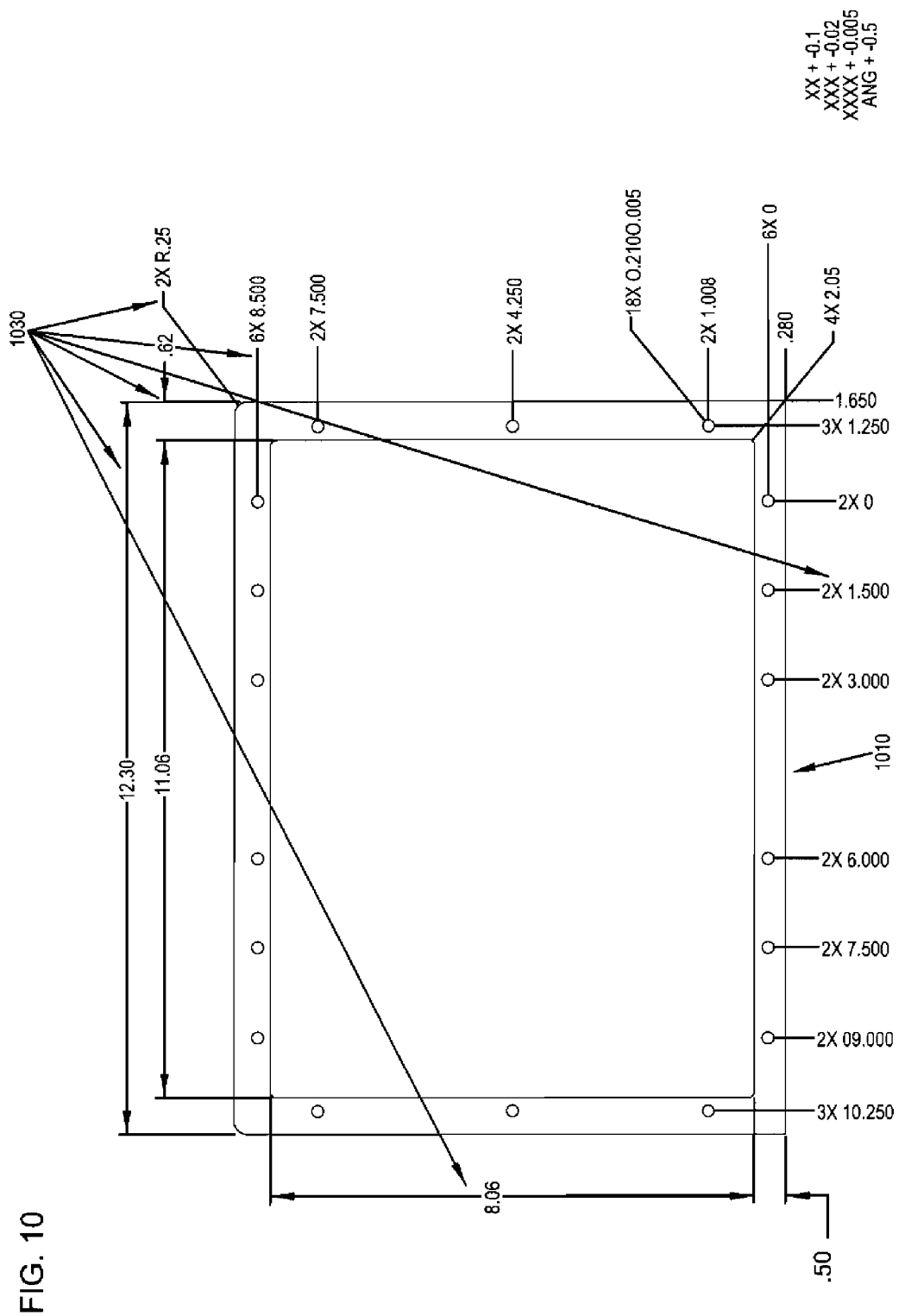
FIG. 10 provides an example diagram of a part of a model with a plurality of dimensional data points.

One embodiment of the blueprint compression process for compressing and translating dimensional data from a double precision format is now described. While the embodiments disclosed herein only describe how dimensional data is compressed and translated, it would be obvious to one skilled in the art to compress and translate other geometric data used to form a model component of a part using the same process. FIG. 9 is a flow chart that illustrates how the dimensional data is translated using a blueprint compression process. Each part of the solid-state model is comprised of a plurality of dimensional data points that specify how inter-related features of a part, such as holes, slots, grooves, cuts, protrusions, etc. are spatially related. FIG. 10 provides an example diagram of a part 1010 of a model with a plurality of dimensional data points 1030. The part 1010 shown in FIG. 10 includes 19 distinct dimensional data points 1030.

At step 910, each of the plurality of dimensional data points are indexed and sorted by magnitude, for example from smallest in magnitude to largest in magnitude. Referring to the example shown in FIG. 10, each dimensional data point is stored in double precision format requiring 64 bits, and thus the total memory required to store the 19 dimensional data points 1030 is 1215 bits or 152 bytes. FIG. 11A provides a table of the dimensional data points 1030 of part 1010 shown in FIG. 10 sorted by an index and FIG. 11B provides a table of the same dimensional data points 1030 sorted from the smallest magnitude in inches to the largest magnitude in inches. In other embodiments, the magnitude may be measured in other types of units, including metric units such as centimeters. Once the plurality of dimensional data points are indexed and sorted by magnitude the process 900 proceeds to step 920.

Beginning with the dimensional data point with the smallest magnitude, step 920 determines the first set of bits. The number of bits stored in the first set of bits is determined by finding the minimum number of bits to contain the maximum whole number difference between two sequential dimensional data points in the sorted list and providing one extra bit. For example, for the part 1010, the maximum whole number difference between two sequential dimensional data points in the sorted list shown in FIG. 11B is two. Therefore the number of bits in the first set of bits is three. Accordingly, the first three bits, representing the most significant bit, the second most significant bit and the third most significant bit, respectively, of the compressed and translated dimensional data point. Hereinafter, the notation of the first bit refers to the most significant bit, the second bit refers to the second most significant bit, and so forth. A difference in magnitude is calculated between the dimensional data point being translated and compressed and the dimensional data point immediately preceding it in magnitude. If the dimensional data point being translated and compressed is the first dimensional data point sorted in step 910, then the difference in magnitude between the dimensional data point and zero is calculated.

The first bit and the second bit of the translated and compressed dimensional data point correspond to the whole number of units difference calculated and the third bit corresponds to whether there is any fraction of units remaining. If the whole number of units difference calculated is three, the first two and the second bit become 11 and if the whole number of units difference is two, the first two bit and the second bit become 10. Accordingly, if the whole number of units difference is one, the first bit and the second bit become 01 and if the whole number of units difference is one, the first bit and the second bit become 00. The third most significant bit is obtained by determining whether there is a fractional remainder. The fractional remainder is determined by taking the difference between the dimensional data point being translated and compressed and the whole number of units associated with stored first and second bits. If the difference is greater than 0, a fractional remainder remains, the third bit becomes 1 and the process proceeds to step 930. If the difference is equal to 0, no fractional remainder remains, the third bit becomes 0 and the process proceeds to step 950. FIG. 11B also provides a table of the first three bit values assigned for the dimensional data points 1030 of the example part 1010 shown in FIG. 10 using step 920.

At step 930 the process 900 determines the fourth, fifth and sixth bits of the compressed and translated dimensional data point. If the fractional remainder is less than 0.25 units, the fourth and fifth bits are stored as 00. If the fractional remainder is 0.25 units or greater, but less than 0.5 units, the fourth and fifth bits are stored as 01. If the fractional remainder is 0.5 units or greater, but less than 0.75 units, the fourth and fifth bits are stored as 10. Lastly if the fractional remainder is 0.75 units or greater, but less than 1 unit, the fourth and fifth bits are stored as 11. The sixth bit is obtained by determining whether there is a second fractional remainder. The second fractional remainder is determined by taking the difference of the fractional remainder and the remainder associated with the fourth and fifth bits. If the difference is greater than 0, a second fractional remainder remains, the sixth bit becomes 1 and the process proceeds to step 940. If the difference is equal to 0, no second fractional remainder remains, the sixth bit becomes 0 and the process proceeds to step 950. FIG. 11C provides a table of the fourth, fifth and sixth bit values assigned for the dimensional data points 1030 of the example part 1010 shown in FIG. 10 using step 930. As shown in FIG. 11C, only 15 of the 19 dimensional data points 1030 required a translated and compressed dimensional data point of more than three bits.

At step 940 the process 900 determines the seventh, eighth and ninth bit of the compressed and translated dimensional data point by using a preset common multiplier. If the common multiplier is less than the second fractional remainder, the second fractional remainder is divided by the common multiplier. The whole number of the result is stored as the third three bits in binary form. In some embodiments a common multiplier of 0.03 units is used to obtain the seventh, eighth and ninth bits. If the common multiplier is greater than the second fractional remainder, the seventh, eighth and ninth bits are set to 000 and the process 900 then proceeds to step 950. For example, FIG. 11D provides a table of the seventh, eighth and ninth bit values assigned for the dimensional data points 1030 of the example part 1010 shown in FIG. 10 using step 940. As shown in FIG. 11D, only 6 of the 19 dimensional data points 1030 required a translated and compressed dimensional data point of more than six bits. In some embodiments, a third fractional remainder can be calculated to determine whether tenth, eleventh and twelfth bits of the compressed and translated dimensional data point are required for lossless compression.

At step 950, the process 900 determines whether each of the plurality of dimensional data points has been compressed and translated. If each dimensional data point has not been translated, the process 900 returns to step 920. If each dimensional data point has been translated, the process 900 ends. This process significantly reduces solid-state model data within a range of approximately 0.1-2% the size of the original solid-state model source data while maintaining near loss-less precision and accuracy.

In some embodiments, the first compressing module 520 is also used to compress the non-geometric data. For example, color information typically stored using red, green and blue components are stored as indices to a custom color palette. Also, numerical non-geometric data, including data referring to surface area, volume, center of gravity, etc. are compressed from a double precision format using methods similar to the blueprint compression method discussed above. The compressed non-geometric data is then sent to the second compressing module 530. In other embodiments, the first compressing module 520 is not used to compress the non-geometric data as the storage requirements for non-geometric data is typically very small compared with geometric data. In these embodiments the original geometric data is sent to the second compressing module 530 without being compressed.

Once the second compressing module 530 receives all of the compressed geometric data and the non-geometric data (compressed or uncompressed) from the first compressing module 520, the second compressing module 530 proceeds with a second level of compression. The second compressing module 530 provides another level of compression to all of the received geometric and non-geometric data using one or more known loss-less compression strategies, such as Run Length Encoding (RLE), Huffman, Rice, Lempel-Ziv (LZ77), and Shannon-Fano compression algorithms, etc. The compressed data is then sent to the storing module 540. The storing module 540 then stores all of the compressed geometric data, including the one or more assembly components, the one or more part components, the one or more surface components and any model components, and all of the compressed non-geometric data into a single file.

Figure 2:
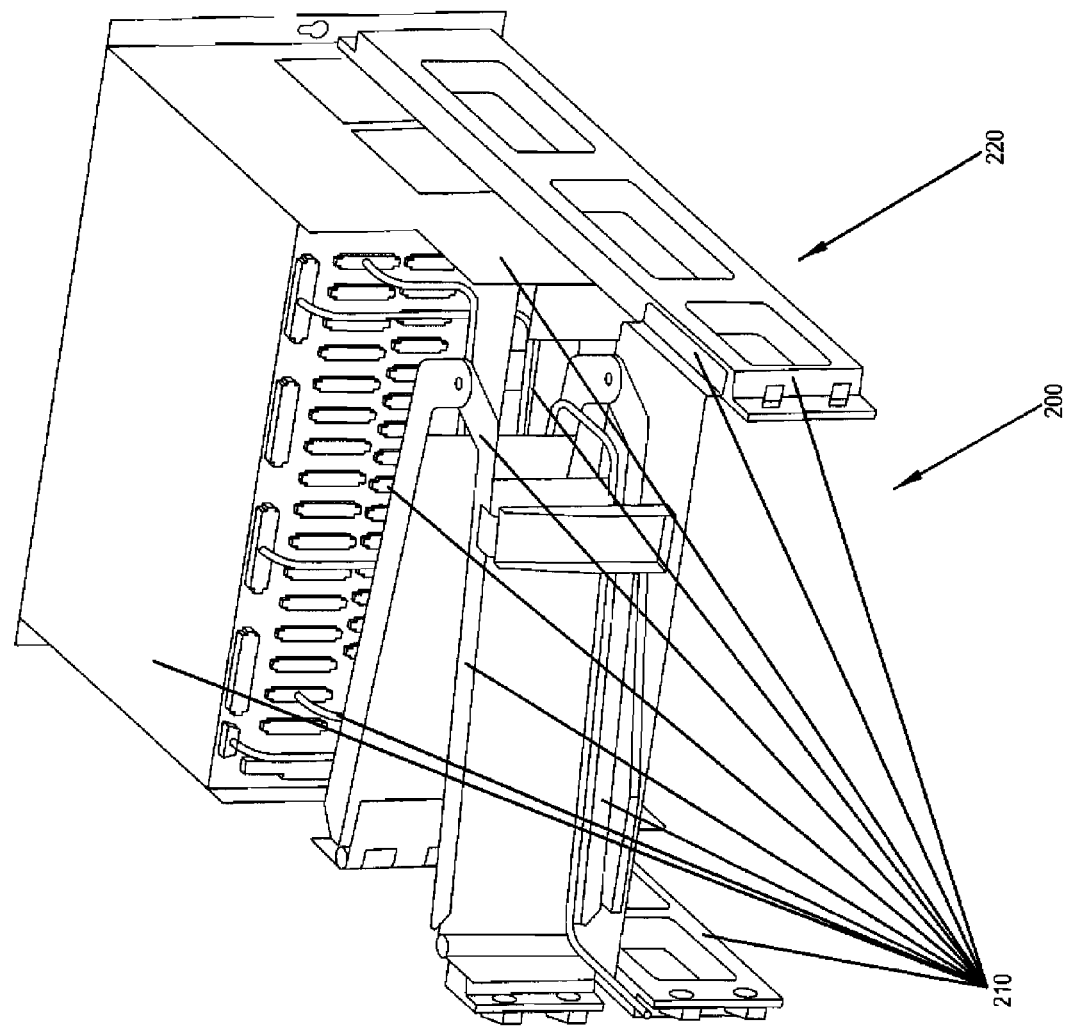
FIG. 2 is one prior art example of a rendered graphical display of a solid-state model using a CAD program made up of a plurality of parts.
Figure 12:
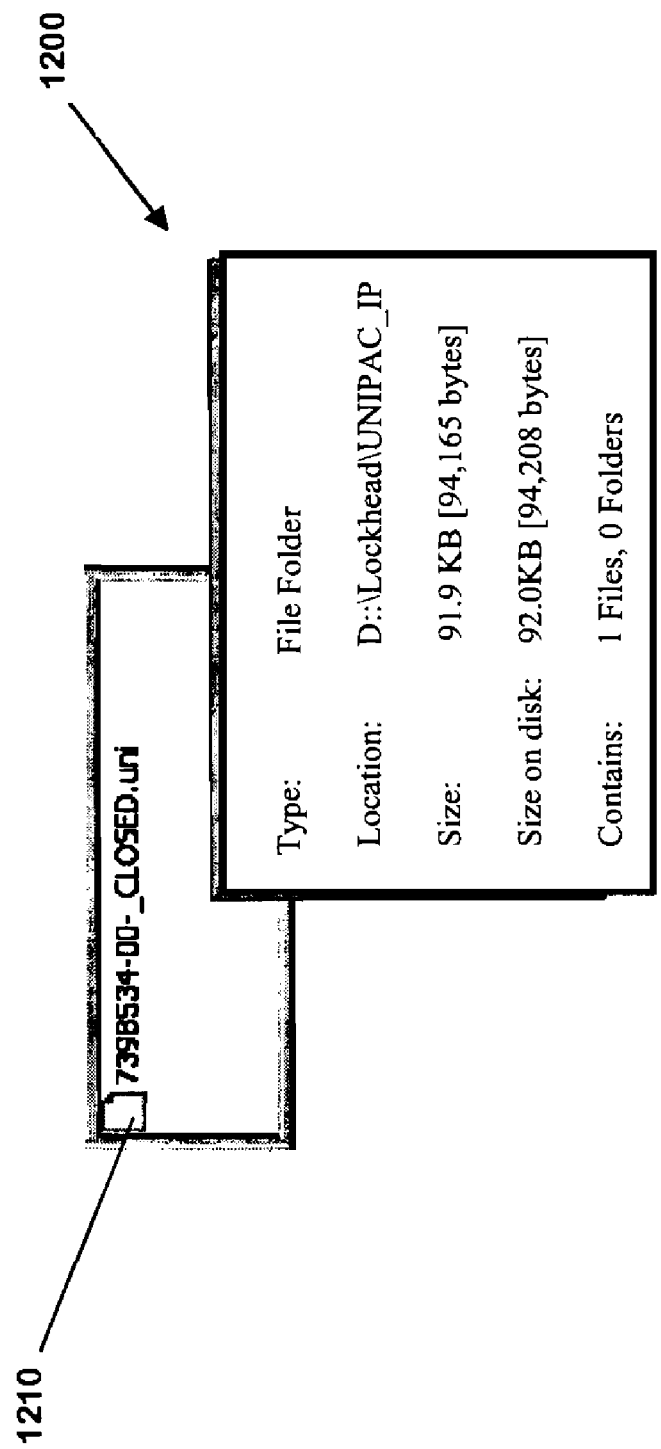
FIG. 12 shows one example of a file directory containing a translated and compressed solid-state model data file of the model shown in FIG. 2.
Figure 13:
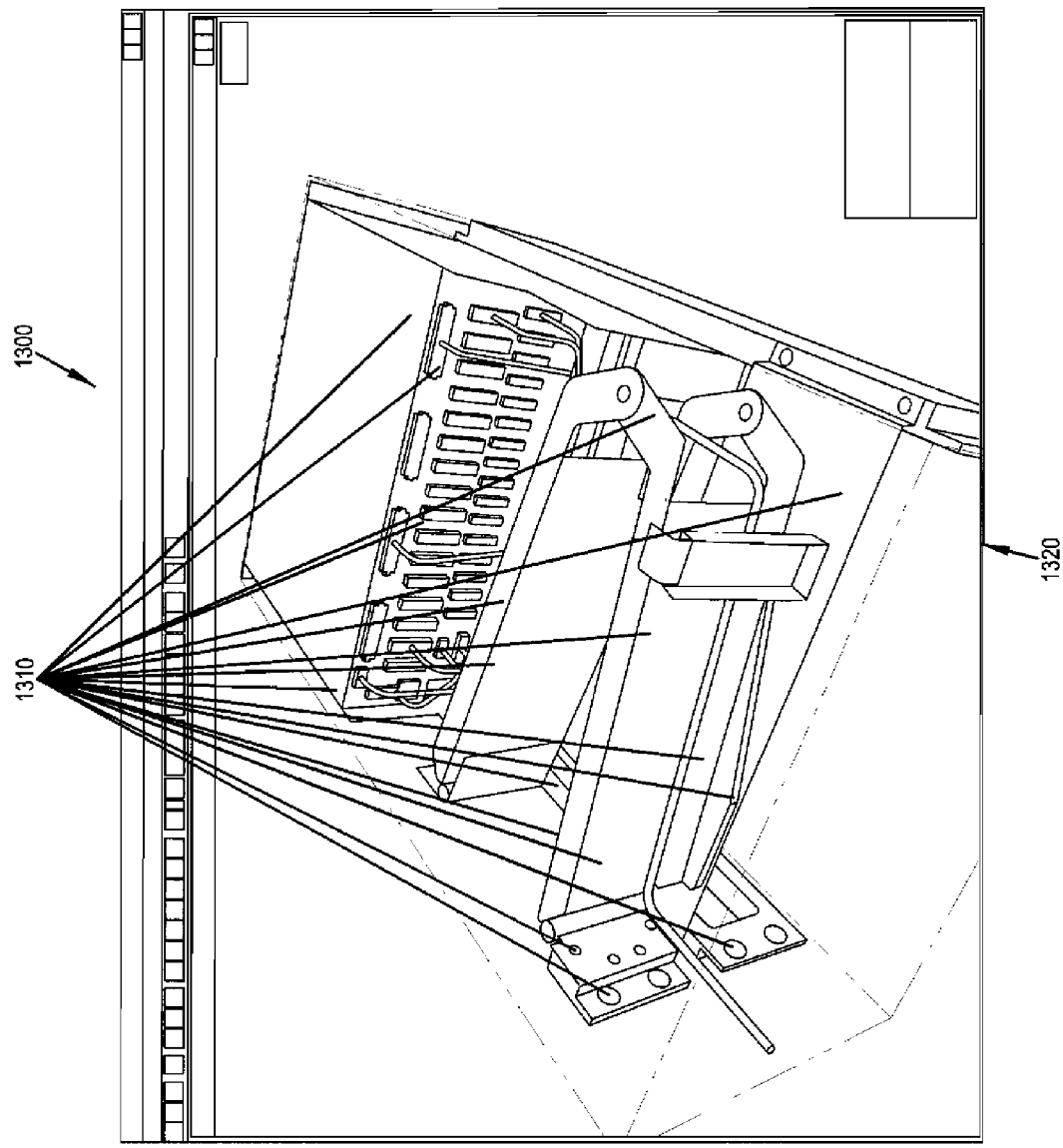
FIG. 13 shows one example of a rendered graphical display of a solid-state model using the translated and compressed solid-state model data file.

FIG. 12 shows one example of a file directory 1200 containing a translated and compressed source data of the model 220 (shown in FIG. 2) stored in a single file 1210. Under the system 500, the source data of the model 220 is translated and compressed from 59 files requiring a total storage capacity of approximately 16,879,616 bytes to a single file 1210 requiring a total storage capacity of approximately 94,208 bytes. Thus, the system 500 is capable of compressing the original source data of the model 220 by a compression factor of approximately 179.2 and storing the compressed source data into the single file 1210, which is approximately 0.558% the size of the original source data. FIG. 13 shows one example of a rendered graphical display 1300 of a plurality of parts components 1310 that form together to create a single model 1320 using the translated and compressed solid-state model data stored in the file 1310.

What is claimed is:

1. A process for compressing, translating and storing solid-state model data for one or more parts that form a solid-state model, comprising:
   extracting the solid-state model data;
   compressing and translating geometric data of the solid-state model data to generate one or more assembly components, one or more part components and one or more surface components;
   storing each of the one or more assembly components, each of one or more part components and each of the one or more surface components into a single file;
   generating a transformation matrix for a newly generated assembly component, a newly generated part component, or a newly generated surface component that is sufficiently similar to a previously generated assembly component, a previously generated part component, or a previously generated surface component; and
   storing the transformation matrix into the single file in place of the newly generated assembly component, the newly generated part component, or the newly generated surface component,
   wherein a portion of the geometric data is translated into a model component using a blueprint compression process that includes:
      translating a first one of a plurality of geometric data points from a double precision format into a blueprint compression format; and
      translating a second one of the plurality of geometric data points from a double precision format into a blueprint compression format,
   wherein translating the second one of the plurality of dimensional data points includes determining a difference between a magnitude of the second one of the plurality of dimensional data points and a magnitude of the first one of the plurality of dimensional data points, and
   wherein the second one of the plurality of dimensional data points immediately precedes or follows the first one of the plurality of dimensional data points if the plurality of dimensional data points are sorted by magnitude.

2. The process of claim 1, wherein the blueprint compression process comprises delineating dimensional data that specifies how interrelated features of the one or more parts that form the solid-state model are spatially related.

3. The process of claim 1, wherein a portion of the geometric data is translated into the one or more surface components using a tessellation compression process.

4. The process of claim 3, wherein the tessellation compression process comprises:
   deconstructing geometric data of the solid-state model data into tessellated data comprising index data, vertex data and normal data,
   determining whether the tessellated data is sufficiently similar to previously deconstructed and stored tessellated data of the solid-state model data;
   storing the tessellated data if the tessellated data is not sufficiently similar to the previously deconstructed and stored tessellated data; and
   generating the transformation matrix that transforms the previously generated and stored tessellated data to the tessellated data if the tessellated data is sufficiently similar to the previously deconstructed and stored tessellated data.

5. The process of claim 4, wherein the tessellation process includes normalizing and storing the index data, vertex data, and normal data at a desired resolution for each component of the solid-state model data relative to the component's minimal and maximal limits.

6. The process of claim 1, wherein the solid-state model data is extracted from a root assembly.

7. The process of claim 1, further compressing the extracted solid-state model data using a loss-less compression strategy.

8. A process for translating and compressing a part of a solid-state model containing dimensional data, comprising:
- translating a first one of a plurality of dimensional data points from a double precision format into a blueprint compression format, wherein each of the dimensional data points specifies how interrelated features of one or more parts that form the solid-state model are spatially related; and
- translating a second one of the plurality of dimensional data points from a double precision format into a blueprint compression format,
- wherein translating the second one of the plurality of dimensional data points includes determining a difference between a magnitude of the second one of the plurality of dimensional data points and a magnitude of the first one of the plurality of dimensional data points,
- wherein the second one of the plurality of dimensional data points immediately precedes or follows the first one of the plurality of dimensional data points if the plurality of dimensional data points are sorted by magnitude.

9. The process of claim 8, wherein translating the second one of the plurality of dimensional data points includes determining a first most significant bit and a second most significant bit based on a whole number difference between the magnitude of the second one of the plurality of dimensional data points and the magnitude of the first one of the plurality of dimensional data points.

10. The process of claim 8, wherein translating the second one of the plurality of dimensional data points includes determining a third most significant bit based on whether the difference between the magnitude of the second one of the plurality of dimensional data points and the magnitude of the first one of the plurality of dimensional data points has a fractional remainder.

11. The process of claim 10, wherein translating the second one of the plurality of dimensional data points includes determining a fourth most significant bit and a fifth most significant bit using the fractional remainder.

12. A system for compressing, translating and storing solid-state model data for one or more parts that form a solid-state model, comprising:
- an extraction module configured to extract solid-state model data from a root assembly;
- a compressing module configured to compress and translate the extracted solid-state model data into one or more assembly components, one or more part components and one or more surface components;
- a storing module configured to store each of the one or more assembly components, the one or more part components and the one or more surface components into a single file,
- wherein the compressing module is further configured to generate a transformation matrix for a newly generated assembly component, a newly generated part component, or a newly generated surface component that is sufficiently similar to a previously generated assembly component, a previously generated part component, or a previously generated surface component,
- wherein the storing module is further configured to store the transformation matrix into the single file in place of the newly generated assembly component, the newly generated part component, or the newly generated surface component,
- wherein the compressing module is configured to compress and translate the extracted solid-state model data into a model component,
- wherein the compressing module is configured to generate compressed dimensional data for a model component using a blueprint compression process that includes:
  - translating a first one of a plurality of geometric data points from a double precision format into a blueprint compression format; and
  - translating a second one of the plurality of geometric data points from a double precision format into a blueprint compression format,
  - wherein translating the second one of the plurality of dimensional data points includes determining a difference between a magnitude of the second one of the plurality of dimensional data points and a magnitude of the first one of the plurality of dimensional data points, and
- wherein the second one of the plurality of dimensional data points immediately precedes or follows the first one of the plurality of dimensional data points if the plurality of dimensional data points are sorted by magnitude.

13. The system of claim 12, wherein the compressing module is configured to generate compressed tessellated data that includes vertex data, index data and normal data for each of the plurality of surface components using a tessellation compression process.

14. The system of claim 12, further comprising a second compressing module configured to compress the extracted solid-state model data using a loss-less compression strategy.

15. The process of claim 1, further comprising generating and storing an identifier into the single file, the identifier associating the transformation matrix with the previously generated assembly component, the previously generated part component, or the previously generated surface component.

16. The system of claim 12, wherein the compressing module is further configured to generate an identifier that associates the transformation matrix with the previously generated assembly component, the previously generated part component, or the previously generated surface component, and
- wherein the storing module is further configured to store the identifier in the single file.

17. A non-transitory computer program product for compressing, translating and storing solid-state model data for one or more parts that form a solid-state model, the computer program product allowing a computer to execute:
- extracting the solid-state model data;
- compressing and translating geometric data of the solid-state model data to generate one or more assembly components, one or more part components and one or more surface components;
- storing each of the one or more assembly components, each of the one or more part components and each of the one or more surface components into a single file;
- generating a transformation matrix for a newly generated assembly component, a newly generated part component, or a newly generated surface component that is sufficiently similar to a previously generated assembly component, a previously generated part component, or a previously generated surface component; and
- storing the transformation matrix into the single file in place of the newly generated assembly component, the newly generated part component, or the newly generated surface component, wherein a portion of the geometric data is translated into a model component using a blueprint compression process that includes:
translating a first one of a plurality of geometric data points from a double precision format into a blueprint compression format; and
translating a second one of the plurality of geometric data points from a double precision format into a blueprint compression format,
wherein translating the second one of the plurality of dimensional data points includes determining a difference between a magnitude of the second one of the plurality of dimensional data points and a magnitude of the first one of the plurality of dimensional data points, and
wherein the second one of the plurality of dimensional data points immediately precedes or follows the first one of the plurality of dimensional data points if the plurality of dimensional data points are sorted by magnitude.

18. The computer program product of claim 17, further allowing the computer to execute:
generating and storing an identifier into the single file, the identifier associating the transformation matrix with the previously generated assembly component, the previously generated part component, or the previously generated surface component.

19. A non-transitory computer program product for translating and compressing a part of a solid-state model containing dimensional data that specifies how interrelated features of one or more parts that form the solid-state model are spatially related, the computer program product allowing a computer to execute:
translating a first one of a plurality of dimensional data points from a double precision format into a blueprint compression format, wherein each of the dimensional data points specifies how interrelated features of one or more parts that form the solid-state model are spatially related; and
translating a second one of the plurality of dimensional data points from a double precision format into a blueprint compression format,
wherein translating the second one of the plurality of dimensional data points includes determining a difference between a magnitude of the second one of the plurality of dimensional data points and a magnitude of the first one of the plurality of dimensional data points,
wherein the second one of the plurality of dimensional data points immediately precedes or follows the first one of the plurality of dimensional data points if the plurality of dimensional data points are sorted by magnitude.

20. The computer program product of claim 19, wherein translating the second one of the plurality of dimensional data points includes determining a first most significant bit and a second most significant bit based on a whole number difference between the magnitude of the second one of the plurality of dimensional data points and the magnitude of the first one of the plurality of dimensional data points.

* * * * *